United States Patent [19]
Kumar et al.

[11] Patent Number: 6,148,269
[45] Date of Patent: Nov. 14, 2000

[54] WHEEL DIAMETER CALIBRATION SYSTEM FOR VEHICLE SLIP/SLIDE CONTROL

[75] Inventors: Ajith Kuttannair Kumar, Erie; Bret Dwayne Worden, Union City, both of Pa.

[73] Assignee: General Electric Company, Erie, Pa.

[21] Appl. No.: 09/118,875

[22] Filed: Jul. 20, 1998

[51] Int. Cl.$^7$ .......................... B61F 13/00; B61K 13/00; G05D 3/00; G06F 17/00
[52] U.S. Cl. .............. 702/96; 180/209; 701/20; 701/82
[58] Field of Search ................ 105/444, 96; 180/209; 702/96; 701/19, 20, 82, 88, 89, 91

[56] References Cited

U.S. PATENT DOCUMENTS

| | | | |
|---|---|---|---|
| 3,715,572 | 2/1973 | Bennett | 701/300 |
| 4,243,927 | 1/1981 | D'Atre | 318/803 |
| 4,347,569 | 8/1982 | Allen et al. | 701/82 |
| 4,896,090 | 1/1990 | Balek et al. | 318/52 |
| 5,740,547 | 4/1998 | Kull et al. | 701/19 |

FOREIGN PATENT DOCUMENTS 364088  4/1990  European Pat. Off. .

OTHER PUBLICATIONS

"Inverter–Induction Motor Drive For Transit Cars," Plunkett, Plette; IEEE Transactions on Industry Applications, vol. 1A–13, Jan./Feb. 1977, pp. 26–37.

*Primary Examiner*—Thomas P. Noland
*Attorney, Agent, or Firm*—Jill Breedlove; James Beuss

[57] ABSTRACT

A method and apparatus for wheel diameter calibration in a vehicle of the type having a plurality of independently powered wheel-axle sets which can be implemented as a forced calibration while the vehicle is in either a tractive effort or an electrical braking mode. The process includes the steps of determining if vehicle tractive effort would be effected if one wheel-axle set were disabled and, if not, selectively disabling one of the wheel-axle sets, calculating vehicle speed from a present value of wheel diameter for the disabled axle and wheel revolutions per unit time, establishing a true value of vehicle speed from an independent measurement, computing the error between calculated vehicle speed and the true value of vehicle speed, and adjusting the present value of wheel diameter so as to minimize the computed speed error.

7 Claims, 3 Drawing Sheets

WHEEL DIAMETER CALIBRATION SYSTEM FOR VEHICLE SLIP/SLIDE CONTROL

BACKGROUND OF THE INVENTION

The present invention relates generally to wheel slip/slide control systems for alternating current induction motor powered traction vehicles such as locomotives or transit vehicles and, more particularly, the invention relates to a method for calibrating wheel diameter during operation of a vehicle for enabling detection of wheel slip or slide.

Locomotives and transit vehicles as well as other large traction vehicles are commonly powered by electric traction motors coupled in driving relationship to one or more axles of the vehicle. Locomotives and transit vehicles generally have at least four axle-wheel sets per vehicle with each axle-wheel set being connected via suitable gearing to the shaft of a separate electric motor commonly referred to as a traction motor. In the motoring mode of operation, the traction motors are supplied with electric current from a controllable source of electric power (e.g., an engine-driven traction alternator) and apply torque to the vehicle wheels which exert tangential force or tractive effort on the surface on which the vehicle is traveling (e.g., the parallel steel rails of a railroad track), thereby propelling the vehicle in a desired direction along the right of way. Alternatively, in an electrical braking mode of operation, the motors serve as axle-driven electrical generators, torque is applied to their shafts by their respectively associated axle-wheel sets which then exert braking effort on the surface, thereby retarding or slowing the vehicle's progress. In either case, good adhesion between each wheel and the surface is required for efficient operation of the vehicle.

It is well known that maximum tractive or braking effort is obtained if each powered wheel of the vehicle is rotating at such an angular velocity that its actual peripheral speed is slightly higher (motoring) or slightly lower (braking) than the true vehicle speed (i.e., the linear speed at which the vehicle is traveling, usually referred to as "ground speed" or "track speed"). The difference between wheel speed and track speed is referred to as "slip speed." There is a relatively low limit value of slip speed at which peak tractive or braking effort is realized. This value, commonly known as maximum "creep speed," is a variable that depends on track speed and rail conditions. So long as the maximum creep speed is not exceeded, the vehicle will operate in a stable microslip or creep mode. If wheel-to-rail adhesion tends to be reduced or lost, some or all of the vehicle wheels may slip excessively, i.e., the actual slip speed may be greater than the maximum creep speed. Such a wheel slip condition, which is characterized in the motoring mode by one or more spinning axle-wheel sets and in the braking mode by one or more sliding or skidding axle-wheel sets, can cause accelerated wheel wear, rail damage, high mechanical stresses in the drive components of the propulsion system, and an undesirable decrease of tractive (or braking) effort.

Many different systems are disclosed in the prior art for automatically detecting and recovering from undesirable wheel slip conditions. Typically, differential speeds between axle-wheel sets or rate of change of wheel speed or a combination of these two measurements are used to detect wheel slip. Speed is monitored and if found to exceed predetermined differentials or rates of change, power to the motors is reduced in an attempt to bring speed to a value at which traction is regained.

In general, locomotive speed or tangential wheel speed can be calculated from measured motor rotor revolutions per minute ("RPM") values given the diameter of the associated wheel. Conventionally, a speed sensor or revolution counter is coupled to sense the rotational speed of an output shaft of each drive motor. The sensed speed is then converted to a value representative of wheel RPM by multiplying the sensed value in RPM by the gear ratio between the drive motor shaft and wheel/axle set. Tangential wheel speed is then calculated from wheel RPM. For example, a standard 42 inch locomotive wheel has a circumference C equal to $\pi$ times diameter D or 131.95 inches so that one wheel revolution advances the vehicle by 131.95 inches, assuming zero slip. From this it can be readily determined that a wheel RPM of 200 will produce a locomotive speed of about 25 MPH or, more precisely, about 24.9899 MPH. If the actual wheel diameter is 41.5 inches, the true velocity can be calculated to be 24.6924 MPH which introduces an error of about 0.3 MPH. This speed difference represents an error which produces slip, since the control system regulates based on the assumed ideal diameter, and leads to a loss of tractive effort as well as creating additional wear on the wheels and rails. More importantly, if wheel calibration is in error, the control system will derate (reduce the available tractive or braking effort) when it is not necessary since the system will detect a speed error indicative of a wheel slip or slide.

The need for wheel diameter calibration has been recognized in the art. Typically, a locomotive is provided with an auxiliary ground speed sensor such as a radar unit (similar to the type used by police for monitoring automobile speed) or a satellite sensor (generally referred to as global position sensor or GPS). The ground speed signal from one of these sensors is compared to the speed determined from the motor shaft RPM sensor value and any error is corrected by adjusting the calculated value of wheel diameter. One problem with the prior art systems is that the comparison or calibration could only be performed when the locomotive was in a coast mode, i.e, the traction motors were not energized for either powering or braking of the locomotive. Further, it was generally necessary for the locomotive to be in such a coast mode for an extended, continuous time in order to complete the calibration. However, there are many instances in which the opportunity to operate a locomotive for an extended period in a coast mode is simply impractical. Accordingly, it would be advantageous to provide a wheel diameter calibration system which does not require coast mode operation and which does not require an extended, continuous time to achieve calibration.

SUMMARY OF THE INVENTION

The present invention is implemented in one form in which a wheel diameter calibration system for a traction vehicle having a plurality of independently powered wheel-axle sets, such as a locomotive, which system allows wheel diameter to be calibrated while the vehicle is in either a tractive effort or electrical braking mode of operation. In the illustrative system, calibration of each wheel-axle set is accomplished by systematically removing power from each wheel-axle set to place that wheel-axle set in a coast mode. The vehicle control initially determines whether a calibration is needed by comparing vehicle velocity as determined by an independent sensor, such as a radar or GPS sensor, to vehicle velocity as determined from a calculation of vehicle speed based upon wheel rotational speed and wheel diameter. If the velocities differ by more than some minimum value, a forced calibration mode is entered. In the forced calibration mode, the control determines first if vehicle tractive effort would be effected if one wheel-axle set were disabled. If not, the one wheel-axle set is disabled, with the commanded tractive effort being distributed over the remaining powered wheel-axle sets. The control thereafter integrates the velocity difference or error while continuously re-computing the error wherein the integrated error value becomes the value of wheel diameter. The control can interrupt the calibration process whenever the disabled wheel-axle set is needed to meet tractive effort requirements. During any interruption in calibration, the last computed value of wheel diameter is maintained so that future calibrations start from the last value thereby allowing calibration to be performed in discontinuous, piecemeal fashion. The control can also accelerate the integration process to perform faster calibration by varying the velocity error signal magnitude by multiplying the error signal by a selectable factor.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 1:
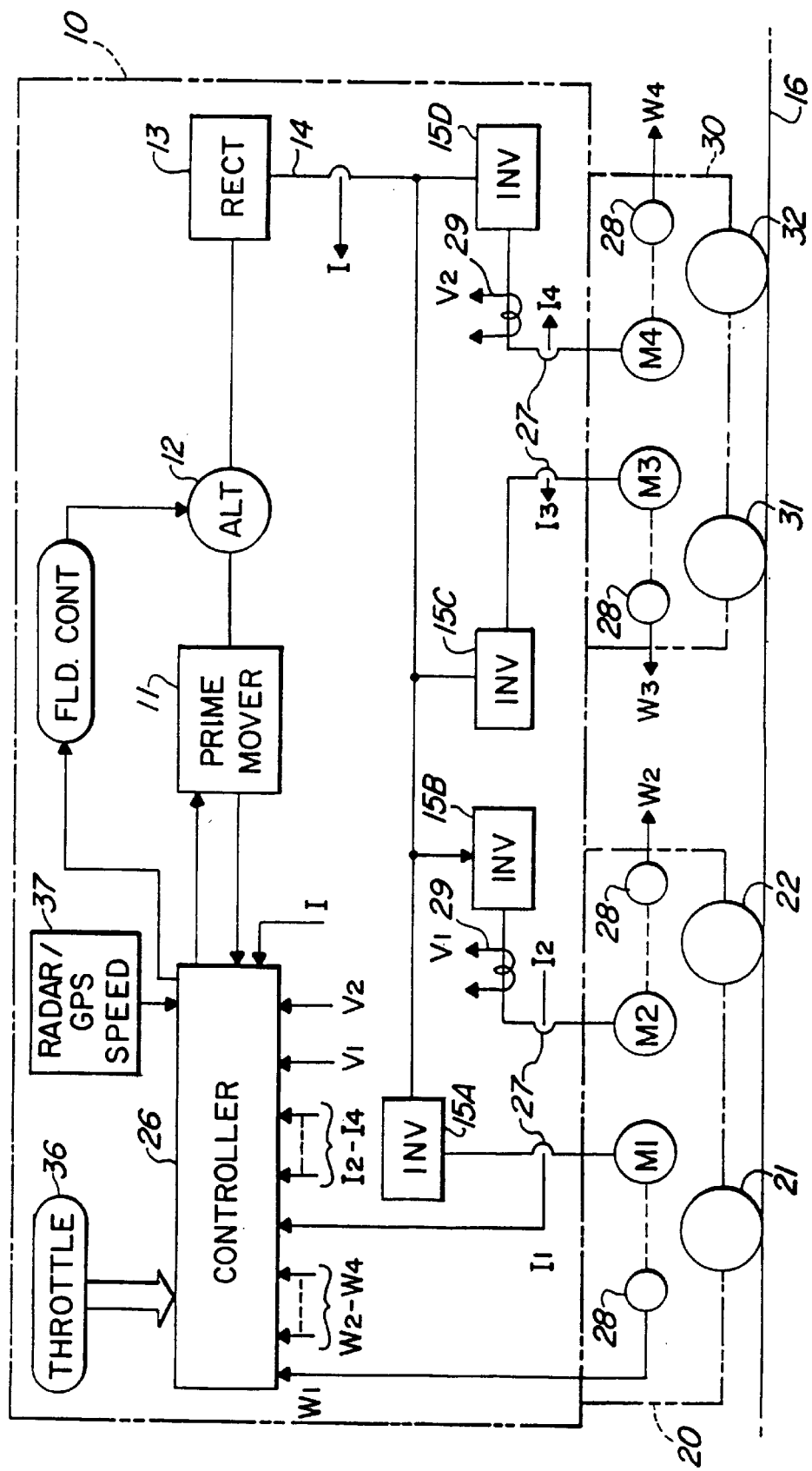
FIG. 1 is a simplified functional block diagram of a vehicle control system with which the present invention may be used.

The present invention may be utilized in various types of alternating current (AC) induction motor powered vehicles such as, for example, transit cars and locomotives. For purpose of illustration, the invention is described herein as it may be applied to a locomotive. The propulsion system 10 of FIG. 1 includes a variable speed prime mover 11 mechanically coupled to a rotor of a dynamo electric machine 12 comprising a 3-phase alternating current (AC) synchronous generator or alternator. The 3-phase voltages developed by alternator 12 are applied to AC input terminals of a conventional power rectifier bridge 13. The direct current (DC) output of bridge 13 is coupled via DC link 14 to a plurality of controlled inverters 15A, 15B, 15C and 15D, each of which inverts the DC power to AC power at a selectable variable frequency. The AC power from each inverter is electrically coupled in energizing relationship to a corresponding one of a plurality of adjustable speed AC traction motors M1 through M4. Prime mover 11, alternator 12, rectifier bridge 13 and inverters 15A through 15D are mounted on a platform of the traction vehicle 10, illustrated as a 4-axle diesel-electric locomotive. The platform is in turn supported on two trucks 20 and 30, the first truck 20 having two axle-wheel sets 21 and 22 and the second truck 30 having two axle-wheel sets 31 and 32.

Each of the traction motors M1–M4 is hung on a separate axle and its rotor is mechanically coupled, via conventional gearing, in driving relationship to the associated axle-wheel set. In the illustrative embodiment, the two motors M1 and M2 are electrically coupled in parallel with one another and receive power from inverters 15A, 15B while motors M3 and M4 are coupled to inverters 15C, 15D. Suitable current transducers 27 and voltage transducers 29 are used to provide a family of current and voltage feedback signals, respectively, representative of the magnitudes of current and voltage in the motor stators. Speed sensors 28 are used to provide RPM signals representative of the rotational speeds W1–W4 in revolutions per minute (RPM) of the motor shafts. These RPM signals are converted to wheel rotational speed from the known gear ratio of the mechanical coupling between the motor shaft and wheel axle. Wheel rotational speed is converted to vehicle linear speed based upon the assumed diameter of each driven wheel. For simplicity, only single lines have been indicated for power flow although it will be apparent that the motors M1–M4 are typically three phase motors so that each power line represents three lines in such applications.

The magnitude of output voltage and current supplied to rectifier bridge 13 is determined by the magnitude of excitation current supplied to the field windings of the alternator 12. The excitation current is set in response to an operator demand (Throttle 36) for vehicle speed by the controller 26 which is in turn responsive to actual speed as represented by signals W1–W4. The controller 26 converts the speed command to a corresponding torque command for use in controlling the motors M1–M4. Since AC motor torque is proportional to rotor current and air gap flux, these quantities may be monitored or, more commonly, other quantities such as applied voltage, stator current and motor RPM may be used to reconstruct motor torque in controller 26. A more detailed analysis of such techniques is given in U.S. Pat. No. 4,243,927 and in a paper published in IEEE Transactions on Industry Applications, Vol. IA-13, No. 1, January 1977, entitled Inverter-induction Motor Drive For Transit Cars by Plunkett and Plette.

In an electrical braking or retarding mode of operation, inertia of the moving vehicle is converted into electrical energy by utilizing the traction motors as generators. Motor voltage and current are controlled to set a desired braking effort.

In either motoring or braking, it is desirable to control the motors so as to minimize slip, i.e., in the illustrative locomotive system to minimize slipping of the wheels on the rail 16. More precisely, it is desirable to control the motors so as to establish a wheel speed corresponding to the desired creep speed so as to achieve peak tractive or braking effort.

Figure 2:
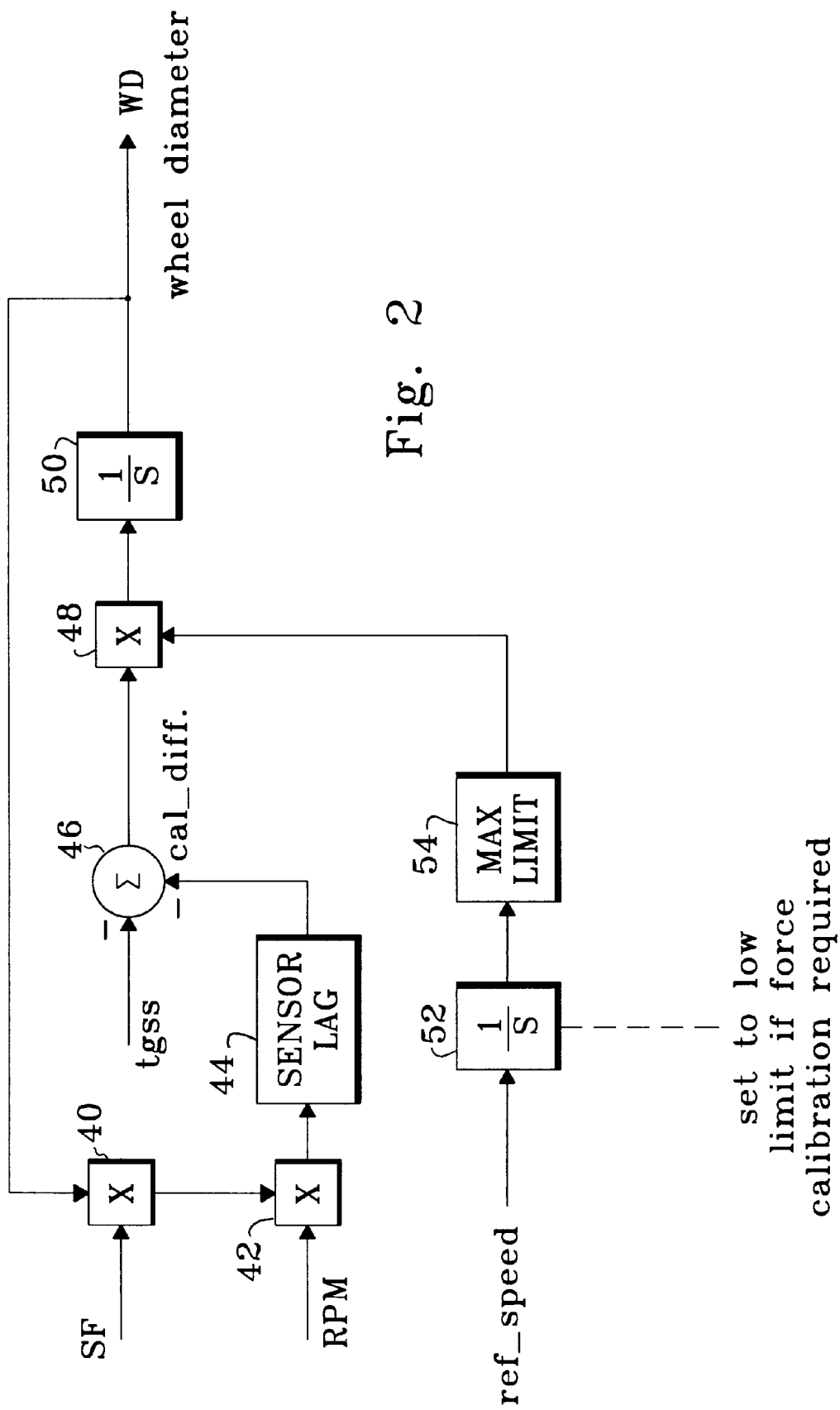
FIG. 2 is a simplified block diagram of one implementation of the present invention.

FIG. 2 is a simplified, functional block diagram of one form in which the present invention can be implemented. The general concept is to provide a method for determining the actual diameter of a locomotive wheel even though the locomotive may be operating in a propulsion or electrical braking mode while calibration is occurring. The general concept further includes a method which allows the rate of calibration to be varied and be accomplished in a piecemeal manner. The calibration process uses two measured variables, axle speed (RPM) and true ground speed (tgss). Typically, the tgss signal is obtained from a conventional radar or GPS sensor, such as is shown at 37 in FIG. 1. Note that the control system of FIG. 2 is preferably implemented in software in the controller 26 although a hardware implementation is illustrated. Further, the system of FIG. 2 is associated with each wheel-axle set so that each can be calibrated.

Initially, the RPM signal is converted to locomotive speed in miles per hour using a current value of wheel diameter (WD) multiplied by a scale factor (SF) in block 40 and then multiplied by RPM in block 42. The algebraic process for converting RPM to vehicle speed was discussed above and it will be apparent from that discussion that the scale factor is a value which converts wheel diameter and RPM to the proper units to obtain a value of miles per hour (MPH). A lag block 44 introduces a time delay equal to the time delay in the tgss sensor so that the two measured values correspond in times taken. The two measured values are summed, summing block 46, to produce a speed error or calibration difference ("CAL-DIFF") signal representing any difference between the values.

The speed error signal is applied to a multiplier, block 48, and the output of the multiplier 48 is applied to an integrator 50. The integrator 50 output represents wheel diameter WD. This implementation allows the wheel diameter value WD to be updated in segments, i.e., the integrator output will remain at its last updated value and can be updated whenever the system permits a calibration cycle.

It may also be desirable to effect an update over a very short interval, e.g., when the locomotive has traveled over a short distance such as 500 feet. This is accomplished in FIG. 2 by changing the value of the error signal, i.e., if the speed error signal is multiplied by some scale factor, the larger error will effect a more rapid change in the integrator 50 output. For this purpose, a speed reference signal, which may be the tgss signal, is integrated in block 52 to convert the signal from distance per unit time to distance. The integrated distance value is limited, block 54, and then applied as a multiplier to block 48. The reference speed value and the resultant multiplier are preferably reduced in value as wheel diameter approaches a true value (speed error becomes less) so as to reduce high frequency gain and minimize vulnerability to noise and transients.

Figure 3:
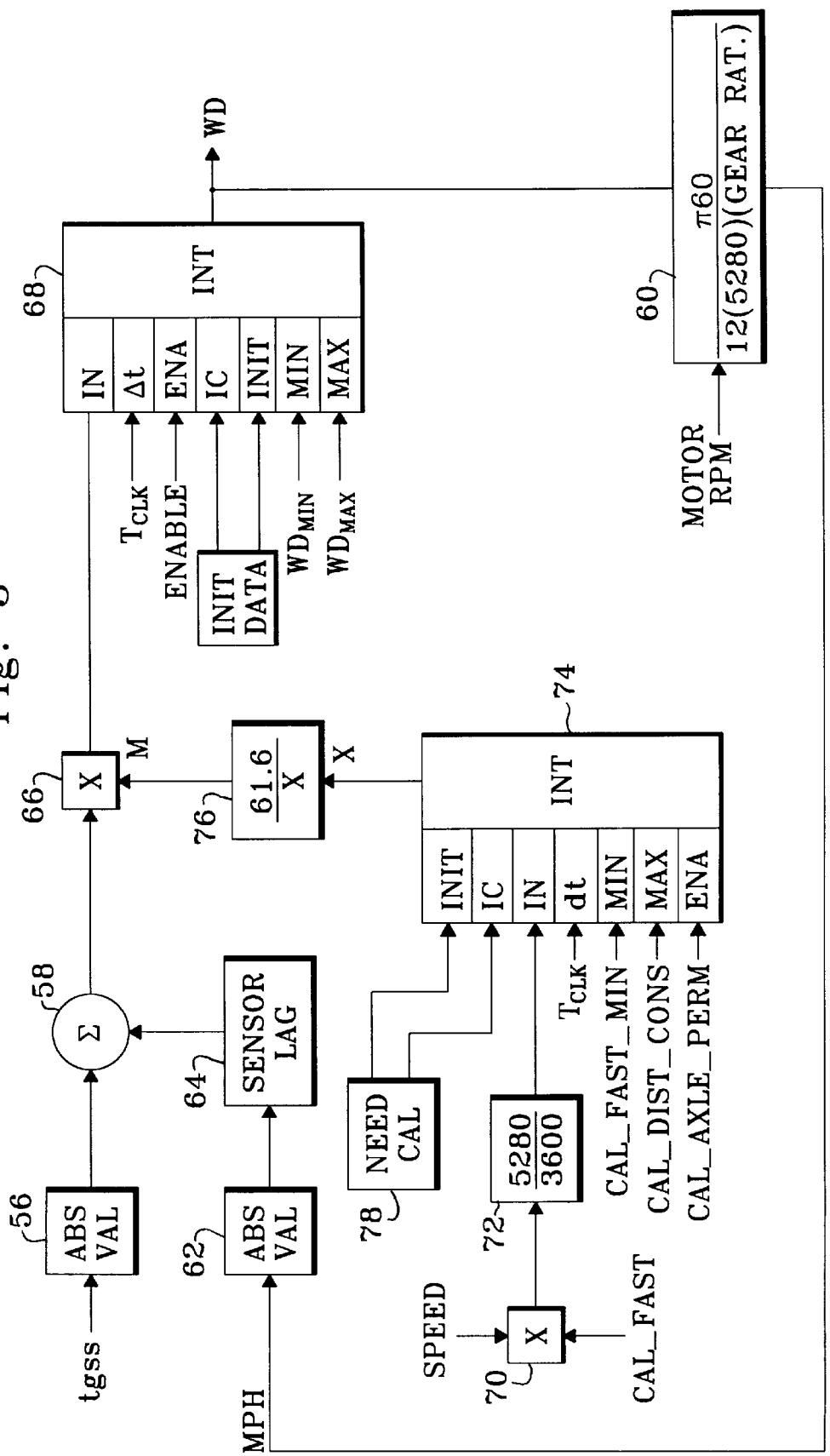
FIG. 3 is a more detailed functional block diagram of the implementation of FIG. 2.

FIG. 3 is a more detailed illustration of one implementation of the present invention. It will be recognized that the invention is preferably implemented in a computer such as the microprocessor-based controller 26 of FIG. 1. However, for purpose of explanation, the implementation is shown in a functional block diagram, several blocks of which correspond to the blocks described above with regard to FIG. 2. The tgss signal is processed through an absolute value circuit 56 (ABS) before being applied to a summing junction 58 (corresponding to block 46). The wheel diameter signal WD is processed through conversion block 60 which also receives the signal representative of motor RPM. The conversion block 60 converts the wheel diameter (in inches) to speed in MPH using conventional conversion values, i.e., MPH=(RPM×W D×π×60)/(12(5280)(Gear Ratio)). The resulting MPH value is processed through absolute value block 62 and sensor lag model block 64. The block 64 is equivalent to block 44 of FIG. 2 and acts as a low pass filter to introduce a selected time delay as discussed with regard to FIG. 2.

The summation of the tgss signals and MPH signals in summing junction 58 produces the speed error signal which is coupled to multiplier block 66. As discussed with respect to FIG. 2, the output signal from the block 66 is integrated, block 68, to produce a signal representative of wheel diameter WD. The multiplier M coupled to block 66 scales the error signal so as to control the rate at which wheel diameter is corrected. An estimate of locomotive speed such as the signal is applied to block 70 where the estimate is multiplied by a calibration constant CAL_FAST which is selected to establish a number of distance constants. The distance constants act like time constants to set a desired rate at which the value of wheel diameter will be adjusted toward a true value. For example, if the CAL_FAST distance constant is set at 100, the wheel diameter will reach 95% of final value when the locomotive has traveled three distance constants or 300 feet.

The signal from multiplier 70 is in miles per hour and in block 72 is converted to feet per second and then applied to integrator block 74. The output of the block 74 is the calibration distance constant X, i.e., the integration process converts the input value in feet per second to an output value in feet. The calibration distance constant is applied to block 76 where it is multiplied by a factor that will result in a closed loop at a time constant of the calibration distance constant divided by speed in feet per second. The value of the multiplication factor depends on an assumed value of wheel diameter. The output of block 76 is the multiplier M which is used in block 66 to adjust the magnitude of the speed error signal in a manner to effect the closed loop calibration in the selected distance.

Note also that the integrator block 74 includes certain limit functions such as maximum and minimum values of calibration distance based on input limits which may be factory set values. Further, the block 74 requires an enable signal when calibration is permitted, i.e., there are certain conditions during which calibration cannot occur and these will be discussed hereinafter. The integrator block 74 also requires a clock input $T_{CLK}$ as a one second timer input to establish a dt integration interval. Still further, the block 74 is initialized in response to a NEED CALIBRATION signal indicated at block 78.

The integrator block 68 is substantially identical to block 74. The only difference in input control signals is that the block 68 is constrained to maximum and minimum values of wheel diameter whereas integrator 74 is constrained to maximum and minimum values of calibration distance constants.

The enable signal for the integrator blocks 74 and 68, referred to as a CAL_AXLE_PERM signal, is active whenever the controller 26 determines that there is no speed sensor failure, the inverter associated with the wheel to be calibrated has been disabled, locomotive speed is greater than 5 MPH, the locomotive air brake is not operating and the rate of change of speed is less than some selected value, for example, 0.25 MPH/SEC for 0.5 seconds. The process of disabling an inverter involves a determination of whether a wheel calibration is needed and whether conditions are appropriate for forcing a wheel calibration. It will be recognized that auto-calibration can occur whenever the locomotive is in a coast mode. One of the features of the present invention is a method for wheel diameter calibration when the locomotive or other vehicle is being operated in propulsion and electrical retarding modes.

A decision that an axle of the vehicle/locomotive needs calibration is determined from a persistence of differences between the calibration speed reference and the axle speed at low torque conditions. The system normally assumes that calibration is unnecessary. However, if the difference between the speed reference, e.g., the radar or GPS reference, and an axle speed signal is greater than a selected value, typically about one per cent, while the axle is operated at a relatively low tractive effort or horsepower (less than about 4500 lbs) and at a speed of more than a selected minimum such as about 5 MPH with all speed sensors operative, then calibration is desirable. Transient conditions are eliminated by requiring the above conditions to exist for some selected time interval such as 20 seconds. If calibration is needed, a NEED_CAL flag (block 78) is set to allow a forced calibration to occur.

A forced calibration of wheel diameter only occurs when the locomotive is operating in propulsion or electrical braking. Accordingly, before implementing a forced calibration, the control system (controller 26) must determine if one inverter can be disabled without effecting locomotive operation. An exemplary set of conditions to evaluate locomotive status is whether the locomotive is in motion and speed is greater than about 5 MPH, air brakes are not in use, the rate of change of speed is less than about 0.25 MPH/SEC for 0.5 seconds and the locomotive is not in a mode in which the commanded tractive effort or horsepower is at or near full power or electricak braking is not greater 50%. In a typical locomotive system, the operator can request power in eight distinctive increments or "notches" and the two highest notches, i.e., notches 7 and 8, are at or near full power so that forced calibration is inhibited in those notches. It will be noted that many of the conditions which allow forced calibration are also used to determine if calibration is permitted. Once the forced calibration conditions have been met, the controller 26 commands zero torque from the selected axle-wheel set which effectively disables the associated inverter. Concurrently, the controller transfers the required tractive effort to other axles so that the calibration process is transparent to the locomotive operator. Calibration then occurs using the procedure described with reference to FIG. 3. Once calibration has started, it can be interrupted and the integrator block 68 will hold the wheel diameter value last attained. If calibration is interrupted, it can be re-initiated at the value last determined when conditions are again permissible. However, if forced calibration is interrupted because calibration is complete or a maximum time limit, such as 4 hours, has expired, no further forced calibration is allowed. A complete "forced calibration" (inverter disabled while wheel diameter is calibrated to 1% of final value) is allowed once per axle per power-up. This avoids nuisance locomotive wheel diameter calibrations due to faulty speed sensors. There is no practical need for more than one calibration since wheel changes are not made while control power is on. Ordinary wheel wear is taken care of by normal calibration since the rate of wear is very slow.

What has been described is a method and apparatus for wheel diameter calibration for a vehicle while the vehicle is exerting tractive effort or electrical braking. Further, the method and apparatus allows a forced calibration to be done in interrupted steps without having to re-start the calibration process. Still further, the method and apparatus allows control of the rate of calibration to quickly compensate for large wheel diameter errors caused by machining or replacement of a wheel.

While the invention has been described with reference to a specific embodiment, various modifications and implementations will become apparent to persons of ordinary skill in the art. It is intended, therefore, that the claims not be limited to the specific disclosed embodiment but be interpreted within the full spirit and scope of the appended claims.

What is claimed:

1. A method for wheel diameter calibration in a vehicle of the type having a plurality of independently powered wheel-axle sets, the method comprising the steps of:

determining if vehicle tractive effort would be effected if one wheel-axle set were disabled and, if not, selectively disabling one of the wheel-axle sets;

calculating vehicle speed from a present value of wheel diameter for the disabled axle and wheel revolutions per unit time;

establishing a true value of vehicle speed from an independent measurement;

computing the error between calculated vehicle speed and the true value of vehicle speed; and adjusting the present value of wheel diameter so as to minimize the computed speed error.

2. The method of claim 1 wherein the step of determining comprises the steps of:

evaluating whether the rate of change of vehicle speed is less than a selected value for a selected time interval;

confirming that vehicle speed is greater than a selected minimum value; and assuring that the vehicle is not operating in an air brake mode, the electrical braking effort is less than a selected maximum value and that commanded tractive effort or horsepower is less than a selected maximum value.

3. The method of claim 2 wherein the selected value of rate of change of speed is 0.25 MPH/SEC for at least 0.5 seconds.

4. The method of claim 2 wherein the selected maximum value of commanded tractive effort or horsepower is less than notch 7 in a system having power settings from notch 1 to notch 8.

5. The method of claim 2 wherein the step of adjusting the value of wheel diameter requires the preliminary steps of confirming that vehicle torque is less than a selected maximum torque, that vehicle speed is greater than a selected minimum speed, that the speed sensors are operational and that the computed error is greater than about one per cent.

6. The method of claim 5 wherein the step of adjusting comprises the step of integrating the speed error value to produce a value of wheel diameter.

7. The method of claim 6 and including the step of modifying the speed error value in a manner to affect a faster time constant for reaching a final value of wheel diameter.

* * * * *